Aug. 9, 1949. J. C. AUTEN 2,478,356
TRANSMISSION CONTROL MECHANISM
Filed April 24, 1946 2 Sheets-Sheet 1
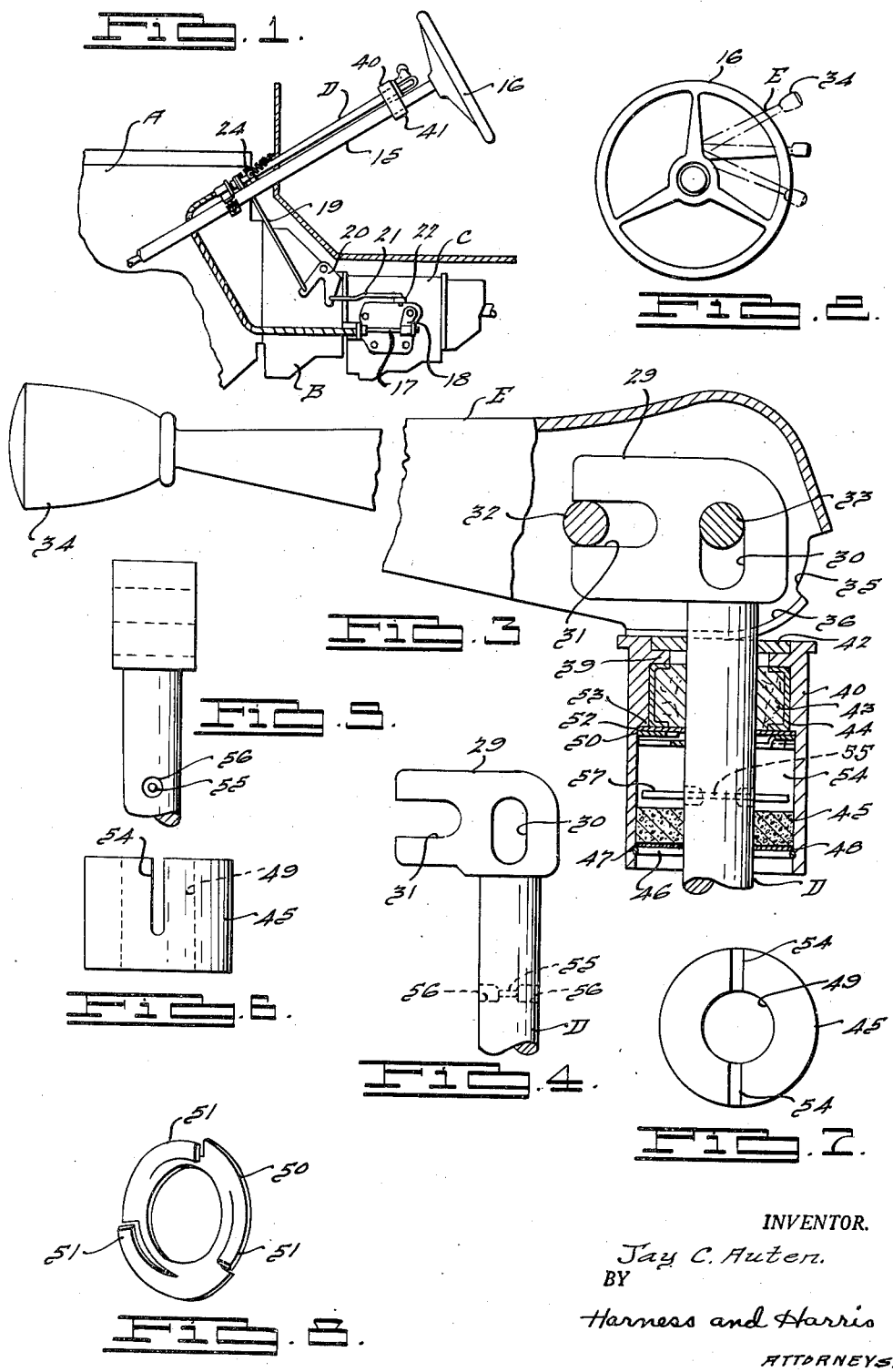
INVENTOR.
Jay C. Auten.
BY
Harness and Harris
ATTORNEYS.

Patented Aug. 9, 1949

2,478,356

UNITED STATES PATENT OFFICE 2,478,356

TRANSMISSION CONTROL MECHANISM

Jay C. Auten, Royal Oak, Mich., assignor to Chrysler Corporation, Highland Park, Mich., a corporation of Delaware Application April 24, 1946, Serial No. 664,520

8 Claims. (Cl. 74—484)

This invention relates to transmission control mechanisms and more particularly to improvements in transmission remote shift mechanisms especially adapted for mounting on motor vehicle steering posts.

It has become common practice in the automotive art to provide a manually operable lever operatively connected to a control rod which is usually mounted on and parallel to the steering column of the motor vehicle. This lever is used by the driver to control the selection and change of the transmission speed ratio drive.

Prior constructions of the mountings for these control levers and rod have been found to be subject to the objections that they permit rattles and that vibrations and road shock induce a whipping motion to the lever in a plane normal to the axis of the lever. The accumulation of permissible relative movement caused by manufacturing tolerances and loose fits between links and levers in the usual linkage operatively connecting the shift lever with the transmission permits the control rod and lever to have a certain amount of substantially unrestrained movement in a plane normal to the axis of the rod independently of the transmission. Road shock and vibration whip the parts about throughout the limits of this possible unrestrained movement. This whipping motion is magnified by the length of the control lever and its mass with its inherent mechanical advantage increases the tendency to whip. This whipping causes rattles, is unsightly and on occasions attains sufficient amplitude to actuate the control mechanism when this is not desired.

It is an object of my invention to provide a mounting for the control mechanism which will dampen the vibration and whipping thereof and which will minimize rattles in the control system.

It is a further object to provide a mounting which will perform these functions and not have the performance thereof affected by temperature or humidity changes. Previous devices which have been proposed as solutions to the problem have had erratic performance because of the fact that performance characteristics of materials used changed with the temperature and humidity.

Previous devices were also unable to provide uniform performance throughout the period of operation of the motor vehicle because of the relatively short life of friction materials used. A further object of my invention is to provide a device which will have a life substantially equal to that of the motor vehicle and throughout which its performance will be substantially uniform.

Further objects and advantages of my invention reside in the combination and arrangement of parts hereinafter described and claimed, reference being had to the accompanying drawings in which:

Fig. 1 is a side elevational view of a typical power plant and steering wheel installation for a motor vehicle showing my invention applied thereto.

Fig. 2 is a plan view of the steering wheel and driver operable shift lever as viewed by the vehicle driver.

Fig. 3 is a sectional elevational view through the control lever and mounting means for the control shaft and lever.

Fig. 4 is a side elevational view of the upper end of the control rod and the extension thereon.

Fig. 5 is an end view of the Fig. 4 device.

Fig. 6 is a side view of the bushing to be assembled in the mounting.

Fig. 7 is a plan view of the Fig. 6 bushing.

Fig. 8 is a perspective view of a spring to be assembled in the mounting.

Figure 9:
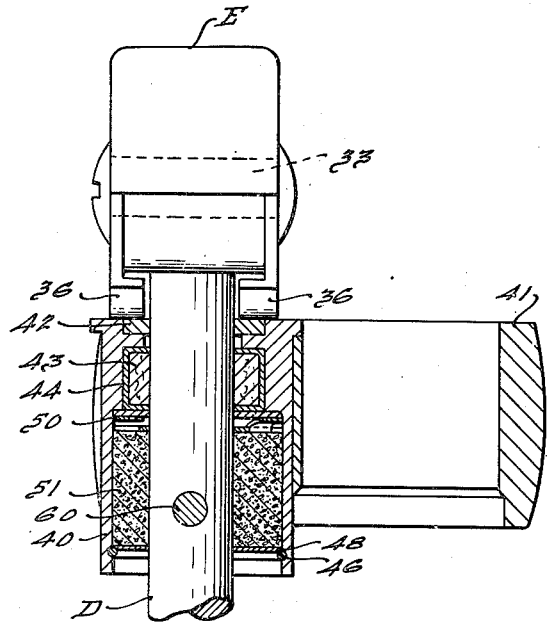
Fig. 9 is an end elevational view in section of a modified form of the Fig. 3 device.
Figure 10:
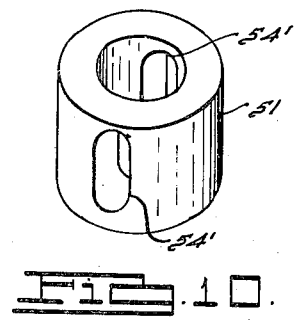
Fig. 10 is a perspective view of the bushing shown in the Fig. 9 assembly.

In the drawings I have illustrated my invention in connection with a motor vehicle comprising the well known engine A, clutch B, and any type of transmission C which is adapted to be manipulated at least in part by the vehicle driver. In general, my invention provides improvements in the transmission control mechanism mountings illustrated in my copending applications Serial No. 586,498, now Patent No. 2,442,159; Serial No. 649,193, now Patent No. 2,432,710; Serial No. 649,-

194, now Patent No. 2,442,634; Serial No. 649,195, now Patent No. 2,432,711; Serial No. 649,196, now Patent No. 2,440,217; and Serial No. 649,197, now Patent No. 2,436,186, and may be employed to advantage in mounting of various types of controls other than those illustrated in these applications. For brevity, my invention has been illustrated herein as used in conjunction with the control mechanism described and claimed in my copending application Serial No. 649,193, although I do not consider its application to be limited to use in conjunction with this control.

My invention provides a means for mounting the control mechanism on the conventional steering post 15 below the steering wheel 16, this steering post having its axis inclined forwardly and downwardly from the steering wheel. A main control rod D extends longitudinally adjacent the post 15 and is adapted to select and operate the transmission control elements for forward and reverse speed ratio drives. When rod D is adjusted from a neutral position in the direction of its axis, such motion is transmitted through any suitable operating connection, such as through the Bowden wire 17, to the transmission selector lever 18. When rod D is rotated about its axis as shown in Fig. 2 such motion is transmitted through any suitable operating connections, such as through the link and lever system 19, 20, 21, to the transmission lever 22 thereby to operate the transmission speed ratio control element which has been selected by longitudinal movement of rod D.

Rod D may be suitably guided adjacent its lower end to accommodate its rotary and longitudinal movements as in the bracket 24 mounted on post 15. Adjacent its upper end rod D is guided by my invention which will be described herein.

In the particular form of control lever and rod illustrated herein the rod D has its upper end formed with a flattened laterally elongated lever-forming head portion 29 slotted at 30 and 31. The slot 31 opens outwardly at the lever portion of head 29 and slidably receives the operating pin 32. The slot 30 is vertically elongated to slidably receive a second similar pin 33. A shift lever E comprises a hollow steel stamping terminating outwardly in a handle or knob 34 adapted to be grasped by the driven in manipulating lever E. At its inner end, the walls of lever E form a housing for the rod head 29. The pins 32 and 33 are fastened to the side walls of lever E. The housing portion of lever E opens downwardly at 35 and for providing a slidable fulcrum mounting of lever E, lever fulcruming rockers 36 are carried by the lever. These rockers or cams are formed adjacent the lower boundary of opening 36 having shift lever supporting faces adapted to bear on the upper face of a stationary washer to be described herein. Rockers 36 are spaced from each other at opposite sides of the axis of rod D, the rockers extending in the general direction of the shift lever E so as to intersect a plane through the axis transversely to lever E.

The pins 32 and 33 supported between the depending side walls of lever E and cooperating with the slotted formation of the lever head 29 effect lift of the rod D in response to lift of lever handle 34 and also maintain lever E positioned against undesired displacement in the direction of its length transversely to the rod axis, and cooperate with the rockers 36 and my mounting to guide up and down shifting movements of lever E. The pin 33 and vertically elongated slot 30 serve to hold the lever E in position lengthwise thereof and at the same time allow the head 29 to be displaced upwardly within lever E when the latter is lifted to effect the selecting axial shift of rod D. A more complete description of the control lever E and its operative connection to rod D may be found in my copending application Serial No. 649,193.

The novel means for mounting rod D and lever E on the steering column 15 is illustrated in Fig. 3. A hollow bracket 40 is fastened to the steering column as shown in Figs. 1 and 9 by a collar 41 preferably integrally united with the bracket. As explained in my copending application Serial No. 649,193, a stationary washer 42 preferably formed from molded and sintered powdered metals and having a lubricant content therein acts as a fulcrum against which lever rockers 36 react. Washer 42 is inserted in the upper surface of bracket 40 and surrounds rod D. However, it should be understood that the washer 42 is only included in the assembly in bracket 40 because it is required by the particular control lever construction illustrated. Other control levers could be used and bracket 40 modified to satisfy their requirements.

A cylindrical mass of fibrous friction material 43 is compressed around rod D and retained within bracket 40 by shoulder 39. Material 43 is preferably retained in a steel case 44, as is well known in the art. This material is the compressible medium used to effect alignment of shaft D with its mountings in bracket 24 at the lower end of rod D. Any misalignment due to manufacturing tolerances of the bearing surfaces provided adjacent the ends of shaft D would cause shaft D to bind if these surfaces were rigid. Therefore, the compressible material 43 is provided to compensate for any slight misalignment. In addition, the fact that the fibrous friction material is non-metallic permits it to operate as a noise dampener.

A cylindrical bushing 45 is retained within bracket 40 by a snap ring 46 which cooperates with a groove 47 formed in the internal surface of bracket 40. In my preferred construction a steel washer 48 separates bushing 45 from snap ring 47 so that any pressure exerted by bushing 45 is distributed over a larger area. Bushing 45 has a longitudinal opening 49 providing a clearance fit around shaft D to permit alignment to be made by material 43 for the reasons explained in the preceding paragraph. Bushing 45 is preferably formed by molding and sintering powdered metal or metals of different melting points in a manner now well known in forming porous metal bearings of the self lubricating type as, by way of example, set forth in patent to C. A. Tea 1,927,619 of September 19, 1933, and to W. G. Calkins et al. 1,927,627 of September 19, 1933. Lubricant may be provided in the form of graphite included in the metal mixture supplemented or substituted by fluid lubricant absorbed by immersing the bushing in lubricating oil then to be exuded to the friction surfaces of the bushing.

A spring 50, preferably having three tangs 51 exerts an axial force on bushing 45 and reacts against a steel washer 52 which abuts shoulder 53 of bracket 40.

A means is provided to permit unrestricted axial movement of rod D and to force bushing 45 to be carried by rod D when the latter is rotated by manual operation of lever E. Bushing 45 has two diametrically opposite longitudinal slots 54 cut on radii thereof. These slots extend from the upper surface downward throughout a substantial portion of the length of bushing 45. When the bushing 45 is assembled in the bracket 40 the slots are preferably aligned with the control lever E. Rod D has a hole 55 drilled therein normal to the rod axis and parallel to the elongated head portion 29. The ends of hole 55 are counterbored as at 56. A flexible pin 57 having substantially the same diameter as hole 55 is assembled therein, preferably by a press fit. The width of slots 54 is determined as substantially equal to the diameter of pin 57 so that a sliding fit is obtained. The diameter of pin 57 may be varied but I have obtained satisfactory results using about ⅛ inch diameter spring wire to form pin 57. It will thus be seen that when lever E is operated to raise or lower rod D the pin 57 can freely travel in slots 54, but when rod D is manually rotated pin 57 and bushing 45 will be carried thereby and rotated.

The construction described above is adapted to restrain vibration of shaft D by means which are substantially unaffected by temperature changes, humidity changes, or continued use. Any force tending to oscillate shaft D must first overcome the friction caused by rotation of bushing 45 under the pressure of spring 50. The friction is created between bushing 45 and washer 48 and between bushing 45 and spring 50 and between spring 50 and washer 52. It is also possible that friction between washer 48 and snap ring 46 and between washer 52 and shoulder 53 is on occasion added thereto. The self lubricating construction of bushing 45 prevents squeaking on the most important friction surfaces.

The pin 57 and slot 54 are preferably parallel to the control lever E for if they were transverse thereto the slight misalignment of the rod D caused by lifting lever E and permitted by compressible material 43 would cause pin 57 to bind in slot 54. The flexibility of pin 57 serves to decrease the amount of noise occasioned by pin 57 striking the sides of slot 54. Manufacturing tolerances permit a slight lateral movement of pin 57 in slot 54. When pin 57 is rigidly constructed a slapping noise is produced by the impact of the pin with the surface of the bushing forming the slot. A flexing of the pin 57 decreases the amount of sound produced by the contact.

Fig. 9 illustrates a modified form of my invention wherein a rigid pin 60 is substituted for flexible pin 57. The friction created by forced rotation of bushing 51 as described above with regard to the Fig. 3 construction is the means for eliminating whip of lever E. The bushing 51 in the modified form differs from the bushing 45 of the Fig. 3 construction in that the slots 54' are larger to accommodate pin 60 and slots 54' do not intersect the upper surface of bushing 51.

Figure 11:
Fig. 11 is a side elevational view of a modified form of pin which may be used in the Fig. 9 assembly.
Figure 12:
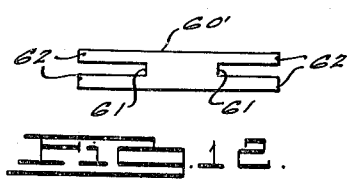
Fig. 12 is a plan view of the pin shown in Fig. 11.

Figs. 11 and 12 illustrate a modified pin 60' which may be substituted in the Fig. 9 construction for pin 60 and which is flexible like the pin of the Fig. 3 construction. The flexibility is obtained in this form by axial slots 61 which leave relatively thin and flexible prongs 62 in engagement with bushing 51 in slot 54'.

Figure 13:
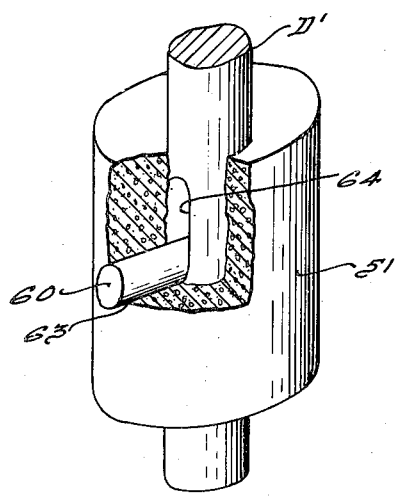
Fig. 13 is a perspective view partly broken away of a modified form of bushing and rod assembly.

Fig. 13 is a perspective view of a modification of the Fig. 9 construction wherein the rod D' is slotted instead of bushing 51. The bushing is merely provided with aligned holes 63 to receive pin 60 which penetrates slot 64 in rod D'.

Rod D could, if desired, be splined or otherwise connected to bushing 45 so that a relative axial motion is permitted while the parts are restrained from rotating independently of each other.

I claim:

1. In a steering column mounted control mechanism for selectively operating speed ratio controls of a motor vehicle transmission, a main rotatable and reciprocatory control rod having its axis extending generally longitudinally of the steering column and adapted for operative connection with the transmission, bearing means adjacent the lower end of said column to support said rod and mounting means adjacent the upper end of said rod to support said rod, said mounting means comprising a housing fastened to said steering column, flexible means carried by said housing and forming a bearing for said rod, the flexible nature of said means facilitating alignment of the rod with said bearing means on the lower end of said column, a cylindrical molded and sintered powdered metal bushing loosely surrounding said rod, said bushing being rotatably mounted in said housing, a spring acting on said bushing and reacting on said housing, said housing having an abutment adapted to engage said bushing, means to rotate said bushing with said rod whereby friction between said abutment and said bushing, between said spring and said bushing, and between said spring and said housing resists rotation of said rod.

2. In a steering column mounted control mechanism for selectively operating speed ratio controls of a motor vehicle transmission, a rotatable and reciprocatory control rod having its axis extending generally longitudinally of the steering column and adapted for operative connection with the transmission, means to manually rotate said rod, a housing fastened to said steering column, a bushing rotatably and slidably mounted in said housing, spring means sliding said bushing into contact with a friction surface carried by said housing, said bushing having a slot therein parallel to said rod, a flexible pin projecting laterally from said rod and engaging said slot to rotate said rod and said bushing as a unit, whereby friction between said bushing and said housing resists rotation of said rod and flexure of said pin minimizes noise produced by the impact of said pin with the side of said slot when said rod is rotated.

3. In a steering column mounted control mechanism for selectively operating speed ratio controls of a motor vehicle transmission, a rotatable and reciprocatory control rod having its axis extending generally longitudinally of the steering column and adapted for operative connection with the transmission, means to manually rotate said rod, a housing fastened to said steering column, a bushing rotatably and slidably mounted in said housing, spring means sliding said bushing into contact with a friction surface carried by said housing, said bushing having a pair of diametrically opposed slots therein parallel to said rod, a flexible pin projecting laterally from said rod and engaging said slots to rotate said rod and said bushing as a unit, whereby friction between said bushing and said housing resists rotation of said rod and flexure of said pin minimizes noise produced by the impact of said pin with the side of said slot when said rod is rotated.

4. In a steering column mounted control mechanism for selectively operating speed ratio controls of a motor vehicle transmission, a rotatable and reciprocatory control rod element having its axis extending generally longitudinally of the steering column and adapted for operative connection with the transmission, a housing fastened to said steering column, a bushing element rotatably mounted in said housing, said bushing element having an axial hole extending throughout its length, said rod element being received in said hole, a pin carried by one of said elements, said pin extending in a direction normal to the axis of said rod element, the other of said elements having an axial slot penetrated by said pin, spring means engaging surfaces of said housing and said bushing under pressure, whereby movement of said pin in said slot permits reciprocation of said rod element relative to said housing and friction between said bushing and said housing resists rotation of said rod.

5. In a steering column mounted control mechanism for selectively operating speed ratio controls of a motor vehicle transmission, a rotatable and reciprocatory control rod having its axis extending generally longitudinally of the steering column and adapted for operative connection with the transmission, means to manually rotate said rod, a housing fastened to said steering column, a bushing rotatably and slidably mounted in said housing, spring means sliding said bushing into contact with a friction surface carried by said housing, means connecting said bushing with said rod to rotate the bushing and rod as a unit, said bushing comprising a body of sintered powdered metal having a lubricant content whereby friction between said bushing and said housing resists rotation of said rod.

6. In a steering column mounted control mechanism for selectively operating speed ratio controls of a motor vehicle transmission, a rotatable and reciprocatory control rod element having its axis extending generally longitudinally of the steering column and adapted for operative connection with the transmission, a housing fastened to said steering column, a bushing element rotatably mounted in said housing, said bushing being formed of sintered powdered metal having a lubricant content and having an axial hole extending throughout its length, said rod element being received in said hole, a pin carried by one of said elements, said pin extending in a direction normal to the axis of said rod element, the other of said elements having an axial slot penetrated by said pin, spring means engaging surfaces of said housing and said bushing under pressure, whereby movement of said pin in said slot permits reciprocation of said rod element relative to said housing and friction between said bushing and said housing resists rotation of said rod.

7. In a steering column mounted control mechanism for selectively operating speed ratio controls of a motor vehicle transmission, a rotatable and reciprocatory control rod element having its axis extending generally longitudinally of the steering column and adapted for operative connection with the transmission, means to manually rotate said rod, a housing fastened to said steering column, a bushing rotatably and slidably mounted in said housing, spring means sliding said bushing into contact with a friction surface carried by said housing, said bushing having a slot therein parallel to said rod, a pin projecting laterally from said rod and engaging said slot to rotate said rod and said bushing as a unit, whereby friction between said bushing and said housing resists rotation of said rod.

8. In a steering column mounted control mechanism for selectively operating speed ratio controls of a motor vehicle transmission, a rotatable and reciprocatory control rod element having its axis extending generally longitudinally of the steering column and adapted for operative connection with the transmission, means to manually rotate said rod, a housing fastened to said steering column, a bushing rotatably and slidably mounted in said housing, spring means sliding said bushing into contact with a friction surface carried by said housing, said bushing having a pair of diametrically opposed slots therein parallel to said rod, a pin projecting laterally from said rod and engaging said slots to rotate said rod and said bushing as a unit, whereby friction between said bushing and said housing resists rotation of said rod.

JAY C. AUTEN.

REFERENCES CITED

The following references are of record in the file of this patent:

UNITED STATES PATENTS

| Number | Name | Date |
| --- | --- | --- |
| 1,727,778 | Kull | Sept. 10, 1929 |
| 2,211,811 | Chisholm | Aug. 20, 1940 |
| 2,290,927 | Wharam | July 28, 1942 |